Patented Apr. 30, 1940

2,198,805

UNITED STATES PATENT OFFICE 2,198,805

MOLDED RESINOUS ARTICLE AND PROCESS OF MAKING THE SAME

Edward R. Dillehay, Glen Ellyn, Ill., assignor to The Richardson Company, Lockland, Ohio, a corporation of Ohio No Drawing. Application January 12, 1937, Serial No. 120,320

9 Claims. (Cl. 154—2)

My invention is addressed to the problem of making molded products in which the binder is a synthetic or condensation resin, but which products are not subject to dimensional changes, e. g. swelling on account of moisture conditions. While not so limited, my invention, for the purpose of making an exemplary showing, will be described in connection with the manufacture of laminated molded products from stocks saturated with synthetic condensation resin of the phenol formaldehyde type.

There are many uses in industry where a molded product not subject to dimensional change is desirable. For example, in bearings or gaskets or packing glands intended for use under conditions subjecting them to water, steam or the like, changes of dimensions due to these conditions may render the parts unsatisfactory for service.

By a material not subject to dimensional change, I mean of course, a material which from the commercial or practical standpoint will not be affected by external conditions sufficiently to produce dimensional changes of important character. A molded product which, when boiled in water would swell a third as much, or less, than the amount of swelling in ordinary laminated products under the same conditions, would be considered an excellent material of this type.

It has been known that molded products are not satisfactory from the standpoint of dimensional constancy under varying external conditions, and attempts have been made to improve such products. The art has believed that a great part of dimensional changes due to moisture and the like, was the result of the lack of penetration or covering of the fibrous materials in the composition by the binder thereof. Consequently, attempts have been made to produce binder substances having greater penetrating power. These substances have been classifiable as water type penetrative varnishes. The so-called varnishes that are commonly used for saturated paper are made from resins which are dissolved in an alcohol solution, sufficient alcohol being used to reduce the solution to a very low viscosity, so that the material will penetrate into the sheet. This type of varnish has the advantage of not greatly weakening paper so that almost any thickness or strength of web can be pulled through the saturating pans without a great deal of difficulty from breakage. It will be understood of course, that the resin at this stage is in an incompletely polymerized condition.

Water type penetrating varnish is made from the same types of resins, excepting that it is not advanced or polymerized to the same stage as a resin intended for alcohol solution. When the resin is in the early stages of reaction and has not advanced to such a high molecular weight, it is still soluble in water and may be used in a water solution giving a saturating material of far less viscosity than is usual in the alcohol type of resin.

However, more generally, the practice in preparing resinous varnish is to advance the resin to a medium stage and then use as a solvent a combination of water and alcohol. This combination seems to give nearly as low a viscosity as a straight water type varnish, provided as much as 30 to 40 per cent of water is used. Either of the water type varnishes to which I have referred, has a much lower viscosity than the alcohol types of varnish; and the water wets and penetrates the sheet and possibly the fibers to a greater extent and therefore appears to give a much better impregnation.

There are certain disadvantages, of course, in using a water type of varnish. For one thing, many fibrous materials are greatly weakened when wet and for some uses therefore, with water type penetrating varnishes, the ordinary saturating machine cannot always be used, and an apparatus known as a Waldron machine may be employed to better advantage. In this type of machine a conveyor is provided which carries the material through the machine.

As I have indicated, water type penetrating varnishes are not new, and molded laminated products have been made therefrom which show a great improvement in dimensional constancy over materials made with alcohol types of varnish. However, these products have possessed only about half the tensile strength and impact strength of the conventional material made with alcohol type varnish; and it has also been found quite difficult to control the manufacture of the product so as to be sure of producing good lamination, due to the very fast type of varnish employed. The products also have exhibited a tendency toward brittleness.

It is a fundamental object of my invention to produce a material having the property of dimensional constancy, but not subject to the disadvantages of the products heretofore made. It is also a primary object of my invention to provide a novel method of making a molded product not subject to dimensional change, the method not involving the operating difficulties hereinabove pointed out, but producing an improved product. These and other objects of my invention, which will be set forth hereinafter or will be apparent to one skilled in the art upon reading these specifications, I accomplish by that certain procedure and in that article of which I shall now describe an exemplary embodiment.

Briefly in the practice of my invention, I employ a water type penetrating varnish but in part only, and I do not rely upon a saturation step using such a varnish to introduce into the sheet or other material all of the resin which the final product is to contain.

I carry on the saturation in a plurality of stages instead of one stage. In an exemplary procedure, using the conventional saturating machine, I treat a web to be saturated first with a water type penetrating varnish but to the extent of saturating into the material only about 20 to 30 per cent of the desired resin content. I then give the product a second treatment with an alcohol type resinous varnish to the extent of bringing the total resin contact of the stock up to say 50 to 60 per cent.

The stock will be dried intermediate the two treatments. I have found that by the use of a shortened treatment with water type penetrating varnish, followed by a treatment with the alcohol type varnish, that I can make a material almost as strong by impact and tensile tests as conventional laminated products made with alcohol type resins, while securing resistance to dimensional changes about equal to that of products made with the water type penetrating varnishes only. It will be understood that the material need not be treated for a shorter length of time in the water varnish, since the varnish may be diluted, if desired, so as to give the lower resin content.

My new products do not present the danger of poor laminating between the layers and have much less tendency toward delamination in manufacture and use. Moreover, the material while being treated with the water type penetrating varnish is much less sensitive than it would be if an attempt were made to introduce the total desired quantities of resinous binder from a water type varnish. Thus the process, while involving an extra step, nevertheless becomes much easier and much less delicate than prior procedures and produces an end product which is superior to any products heretofore made.

Either the treatment of the product with the water type penetrating varnish is sufficient to produce the desired penetration for resistance to chemical change, or it produces an incipient penetration which is brought to completion during the treatment of the product with the alcohol type varnish. Where other materials are desired in the fabric such, for example as the exceedingly finely divided graphite to which the co-pending application Serial Number 93,449 filed July 30, 1936 of Louis T. Frederick relates, such materials may be introduced into the sheet in either or both stages of the saturation procedure by being mixed with the several varnishes involved. In the manufacture of molded products of laminated character, I may of course, use paper webs and their equivalents or cloth webs and their equivalents as will be clear. Also my teachings may be applied to the saturation of fibrous or cord-like stocks of varying character which are not in themselves in the form of sheets or webs. Nor am I limited to two stages only in the manufacture of products herein described. The stages may be multiplied as desired. In the practice of my invention, for the making of completed molded articles, the saturated stocks are, of course, placed together and pressed and cured under heat and great pressure as in the ordinary way of making such products.

In the claims which follow the terms "water type penetrating resinous varnishes", "water type penetrating varnish", are to be taken to mean a solution of incompletely polymerized resin in water or in a mixture of water and alcohol, the said solution having a relatively low viscosity, as defined on page 1 of this specification. The terms "alcohol type varnishes", "alcohol type resinous varnishes", "alcohol varnish" are to be taken to mean a solution of incompletely polymerization dissolved in alcohol as defined on page 1, of this specification, said solution having a relatively higher viscosity.

Modifications may be made in my invention without departing from the spirit of it.

Having thus described my invention, what I claim as new and desire to secure by Letters Patent is:

1. In the manufacture of resinous stocks characterized by resistance to dimensional changes, the steps of saturating said stocks first with a solution of resin in water and then with a solution of resin in alcohol alone, in successive stages in the order named.

2. In a process of making a saturated resinous stock for pressing and curing, the steps of leading the said stock first through a saturating bath of a solution of resin in water, but to the extent of introducing into the stock a part only of the desired resinous content, and then leading the stock through a solution of resin in alcohol alone, to bring the resinous content up to the desired total content.

3. A process of producing saturated resinous stocks for pressing and curing, which comprises leading a stock successively first through a saturating bath of a solution of resin in water, while controlling the said step to prevent the weakening of the stock and to limit the amount of resin so introduced, and thereafter leading the stock through a solution of resin in alcohol alone to bring the resinous content thereof up to the desired value.

4. A process of making pressed and cured articles which comprises introducing into a fibrous stock in successive increments in the order named, an incompletely polymerized resin derived from a solution thereof in water, and an incompletely polymerized resin derived from a solution thereof in alcohol alone, and pressing and curing the treated stock thus formed.

5. A process of making a pressed and cured laminated resinous article which comprises leading a fibrous stock successively through a bath which is a solution of resin in water, and thereafter leading said stock through a bath which is a solution of resin in alcohol alone, then laminating layers of the said stock and pressing and curing the article thus formed.

6. A resinous stock for pressing and curing, comprising a fibrous base which contains an increment of resin derived from a solution of resin in water, said increment having primary association with the fibers of said base, and an increment of resin derived from a solution of resin in alcohol alone, said last mentioned increment having secondary association with the fibers of said base.

7. A molded resinous article of laminated character containing laminations of fibrous material, which laminations contain each an increment of resin derived from a water solution of resin, said increment being in primary association with the fibers of said lamination, and an increment of resin derived from a solution of resin in alcohol alone, said last mentioned increment of resin being in secondary association with the fibers of said lamination.

8. An article as claimed in claim 7 in which the said several increments of resin are substantially equal in amount.

9. A process of making resinous stocks suitable for pressing and curing, which comprises treating fibrous stocks successively first with a water solution of resin, second drying said stocks, third treating said stocks with a solution of resin in alcohol alone, and fourth drying said stocks.

EDWARD R. DILLEHAY.